US008274448B1

(12) United States Patent
Cook (10) Patent No.: US 8,274,448 B1
(45) Date of Patent: Sep. 25, 2012

(54) STEREOSCOPIC DISPLAY SYSTEM, METHOD AND COMPUTER PROGRAM PRODUCT

(75) Inventor: David Robert Cook, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 768 days.

(21) Appl. No.: 11/531,995

(22) Filed: Sep. 14, 2006

Related U.S. Application Data

(60) Provisional application No. 60/787,730, filed on Mar. 29, 2006.

(51) Int. Cl.
*G09G 5/00* (2006.01)

(52) U.S. Cl. ............................................................ 345/9

(58) Field of Classification Search .................. 345/6, 9, 345/32; 349/15; 348/42–48; 353/7
See application file for complete search history.

(56) References Cited

U.S. PATENT DOCUMENTS

| | | | |
|---|---|---|---|
| 4,523,226 A * | 6/1985 | Lipton et al. ..................... 348/49 |
| 4,872,750 A * | 10/1989 | Morishita ........................ 353/7 |
| 5,471,237 A | 11/1995 | Shipp |
| 5,594,843 A | 1/1997 | O'Neill |
| 5,684,529 A | 11/1997 | Yoshimi et al. |
| 6,057,811 A * | 5/2000 | Edwards ............................ 345/8 |
| 6,088,052 A * | 7/2000 | Guralnick ........................ 348/51 |
| 6,108,005 A | 8/2000 | Starks et al. |
| 6,801,242 B1 | 10/2004 | Dwyer |
| 6,996,267 B2 | 2/2006 | Tabata |
| 7,046,270 B2 | 5/2006 | Murata et al. |
| 2003/0060679 A1 | 3/2003 | Murata et al. |
| 2004/0057612 A1 | 3/2004 | Tabata |
| 2004/0210857 A1 | 10/2004 | Srinivasan |
| 2005/0140640 A1* | 6/2005 | Oh et al. ........................ 345/102 |
| 2006/0170834 A1* | 8/2006 | Kim et al. ........................ 349/15 |
| 2006/0203085 A1* | 9/2006 | Tomita ............................ 348/51 |
| 2007/0052640 A1* | 3/2007 | Feldman ........................ 345/88 |
| 2007/0229395 A1 | 10/2007 | Slavenburg et al. .............. 345/8 |
| 2007/0229487 A1 | 10/2007 | Slavenburg et al. ............ 345/213 |

OTHER PUBLICATIONS

U.S. Appl. No. 11/532,005, filed Sep. 14, 2006.
"i-O Display Systems" http://www.i-glassstore.com/index.html p. 1-2.
Non-Final Office Action from U.S. Appl. No. 11/532,005, dated Jun. 25, 2010.
Final Office Action from U.S. Appl. No. 11/532,005, dated Oct. 28, 2010.
Non-Final Office Action from U.S. Appl. No. 11/532,005, dated Apr. 28, 2011.
Advisory Action from U.S. Appl. No. 11/532,005, dated Jan. 20, 2012.
Final Office Action from U.S. Appl. No. 11/532,005, dated Nov. 14, 2011.
Non-Final Office Action from U.S. Appl. No. 11/532,005, dated Mar. 7, 2012.
"i-O Display Systems" http://www.i-glassstore.com/index.html, Jun. 14, 2006, p. 1-2.

* cited by examiner

*Primary Examiner* — Chanh Nguyen
*Assistant Examiner* — Ram Mistry
(74) *Attorney, Agent, or Firm* — Zilka-Kotab, PC (57) ABSTRACT

A stereoscopic display system, method and computer program product are provided. In use, display content intended for a first eye is displayed utilizing a first portion of a display. Further, display content intended for a second eye is displayed utilizing a second portion of the display that is different from the first portion of the display.

31 Claims, 6 Drawing Sheets

STEREOSCOPIC DISPLAY SYSTEM, METHOD AND COMPUTER PROGRAM PRODUCT

RELATED APPLICATION(S)

The present application claims priority of a provisional application filed Mar. 29, 2006 under application Ser. No. 60/787,730, which is incorporated herein by reference in its entirety.

FIELD OF THE INVENTION

The present invention relates to displaying stereo display content, and more particularly to display systems adapted for displaying stereo display content.

BACKGROUND

Various display devices are equipped for stereo viewing. Unlike mono viewing, stereo viewing involves the display of separate content for the right and left human eye. Specifically, such stereo viewing requires the presentation of a separate image to the left and right human eye. In one particular type of stereo viewing, namely time sequential stereo viewing, such left and right images are presented in an alternating manner. To ensure a proper stereo viewing experience, stereoscopic glasses are also typically used which make the left image only visible to the left eye and the right image only visible to the right eye at the appropriate time.

In the past, time sequential stereo viewing has worked well on CRTs and related displays [e.g. high frame rate (DLP) projectors, etc.]. However, time sequential stereo viewing has not shown promise with liquid crystal displays (LCDs), whether flat-panel or in the form of a projector, due to several issues. For example, a slow response time of pixels in LCD environments causes "ghosting" of the left image in the right view, and visa versa.

Figure 1:
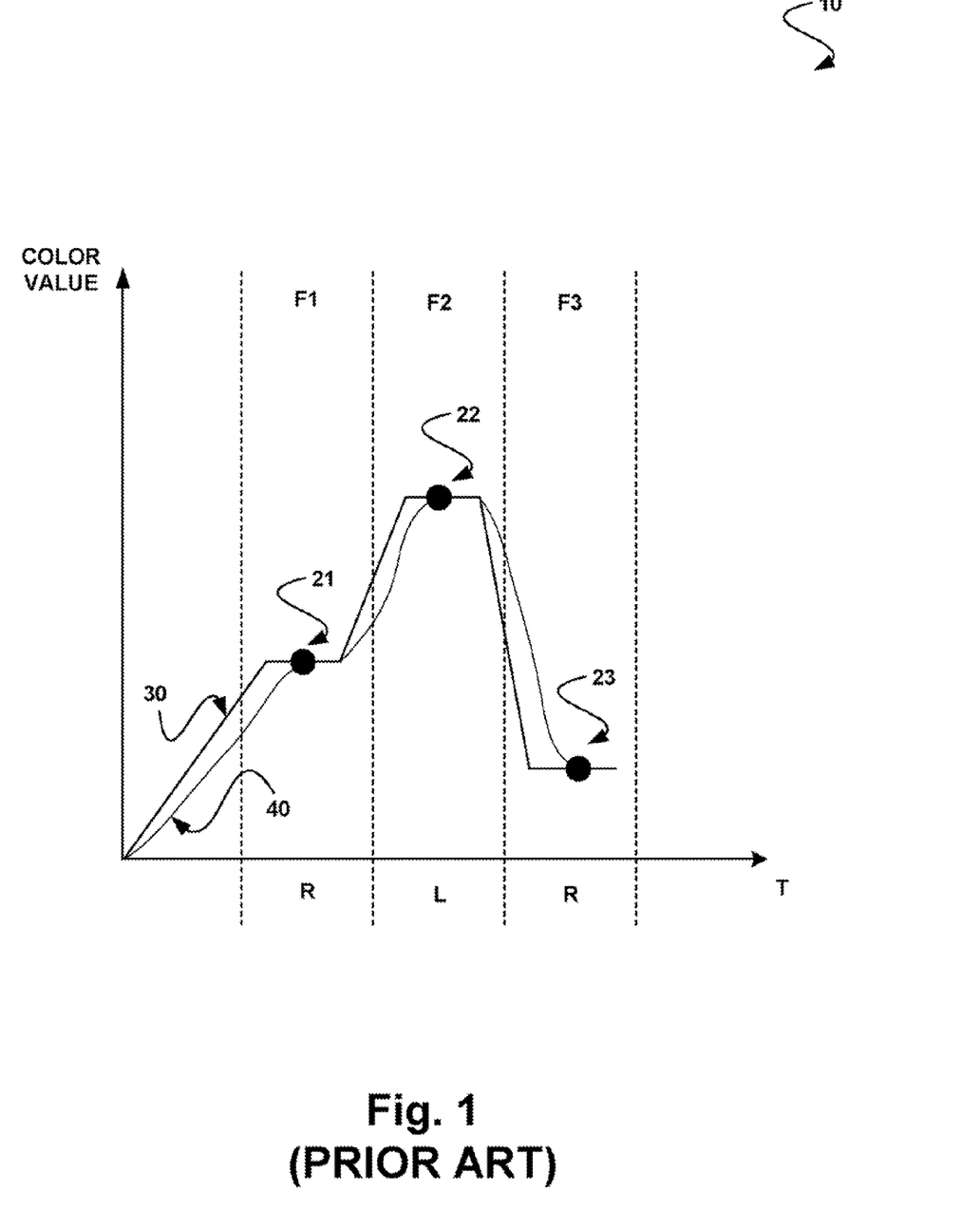
FIG. 1 illustrates hypothetical shortcomings that would exist if stereo viewing were attempted utilizing a liquid crystal display (LCD).

Prior art FIG. 1 includes a graph 10 showing the slow response time associated with the use of an LCD or similar device. As shown, a display control signal 30 is shown for controlling a particular pixel of the LCD to display a relevant portion of various frames F1, F2, F3 of display content to a tight and left eye of a user. Such display control signal 30 is configured to depict a first color value 21 during the display of a first frame F1 (intended for a right eye of the user), a second color value 22 during the display of a second frame F2 (intended for a left eye of the user), and a third color value 23 during the display of a third frame F3 (intended for the right eve of the user), etc.

Due to the aforementioned slow response time of LCD pixels, an actual output 40 is shown to lag the display control signal 30. This results in a pixel value of a previous frame "bleeding" into in a pixel value of a subsequent frame which, in turn, results in each eye unfortunately, receiving content, at least in part, not intended for such eye, causing less-than-desired stereo viewing (e.g. the aforementioned ghosting, etc).

Where prior art techniques exist for addressing this shortcoming (e.g. overdriving pixel values, etc.), there is still a continuing need for overcoming this and/or other problems associated with the prior art.

SUMMARY

A stereoscopic display system, method and computer program product are provided. In use, display content intended for a first eye is displayed utilizing a first portion of a display. Further, display content intended for a second eye is displayed utilizing a second portion of the display that is different from the first portion of the display.

DETAILED DESCRIPTION

Figure 2:
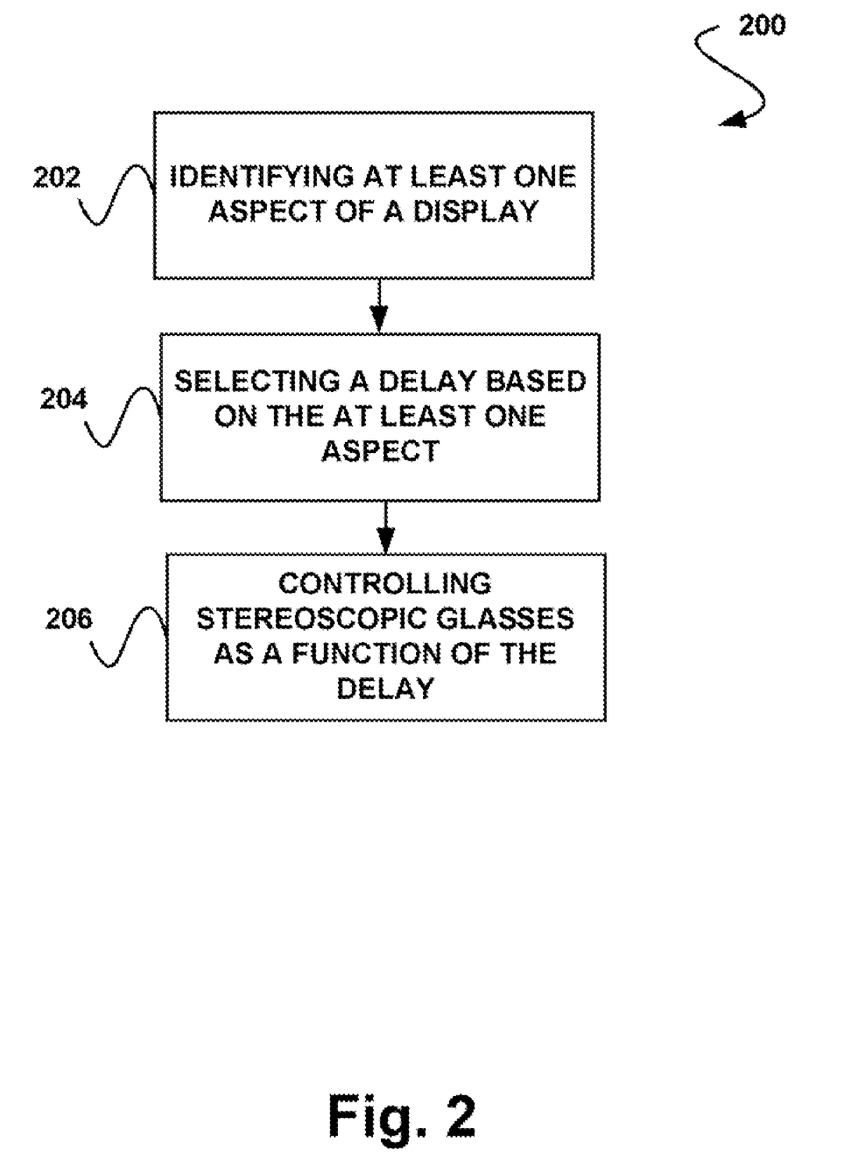
FIG. 2 shows a method for controlling stereoscopic glasses, in accordance with one embodiment.

FIG. 2 shows a method 200 for controlling stereoscopic glasses, in accordance with one embodiment. As shown, at least one aspect of a display is identified. See operation 202. Such display may include a liquid crystal display (LCD), digital light processing (DLP) display, liquid crystal on silicon (LCOS) display, plasma display, or any other display device, for that matter.

Further, in various embodiments, the aforementioned aspect of the display may include a timing associated with the display. For example, the display may be capable of operating in different modes of operation, where each mode has a corresponding timing. Such modes may refer to different resolutions (within the capability of the display), as well as an update rate. One example of a specific mode is shown in Table 1 below:

TABLE 1

(horizontal resolution=1280)×(vertical resolution=1024)×(update rate=60Hz)

It should be noted that such exemplary mode is set forth for illustrative purposes only and should not be considered as limiting in any manner. Of course, different values are contemplated.

Still yet, in another embodiment, the aspect may include a physical aspect associated with the display. Thus, in the context of the present description, the aspect may be physical in nature (e.g. mechanical, model/brand, etc.) or operational in nature (e.g. functional, control, etc.), and/or include any other characteristic, feature, etc., for that matter.

In operation 204, a delay is selected based on the at least one aspect. In one embodiment, a plurality of delays may be predetermined and made available, with each delay being associated with different, aspects of different displays. To this end, the delay that corresponds with a particular aspect of a particular display may be selected in operation 204. To accomplish this, a look-up table may be included for providing access to such delays.

In still other embodiments, the look-up table may be accessed utilizing a driver which is used to control the display. In such embodiments, the driver may serve to perform operations 202 and 204. In yet other embodiments, the foregoing functionality of such a driver may be manually or automatically initiated each time a display is selected/detected, in an adaptable/dynamic manner.

Of course, such exemplary selection technique is set forth for illustrative purposes only. For instance, in other embodiments, absolutely any selection technique may be employed which results in the identification eta delay for use in the manner to be set forth below. Just by way of example, the selection may involve the calculation of the delay, and/or any other determination of the delay, for that matter.

Thus, the stereoscopic glasses may be controlled as a function of the delay. See operation 206. In one exemplary embodiment, the stereoscopic glasses may be controlled by incorporating the delay in association with a triggering of the stereoscopic glasses. In the context of the present description, such triggering may refer to any activation/deactivation of the stereoscopic glasses (e.g. switching between an open/closed orientation, etc.).

While the delay may be incorporated and used in any desired manner, it may, in one embodiment, be incorporated by controlling the stereoscopic glasses such that they are triggered after the delay elapses. For example, in one embodiment, the delay may specifically occur after a vertical synchronization (Vsync) signal. Thus, in such embodiment, the Vsync signal, which typically triggers the glasses may, instead, initiate the selected delay, after which the stereoscopic glasses are activated. More information regarding such specific use of the delay will be set forth hereinafter in greater detail during reference to FIG. 3.

In one embodiment, the above delay may be used to reduce a time during which each eye of a user receives content, at least in part, not intended for such eye. Further, such delay may be tuned (e.g. via the aforementioned selection, etc.) to achieve such reduction in an ideal manner. For example, in a situation where a display is updated in an accelerated mode, such delay may be shorter with respect to other modes, etc. While different ways are contemplated of utilizing the aforementioned delay for the foregoing purpose, it should be noted that the delay may be used to control the stereoscopic glasses in any other desired manner for this or any other purpose (to similarly or otherwise improve stereo viewing, etc.).

More illustrative information will now be set forth regarding various optional architectures and features of different embodiments with which the foregoing functionality may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3:
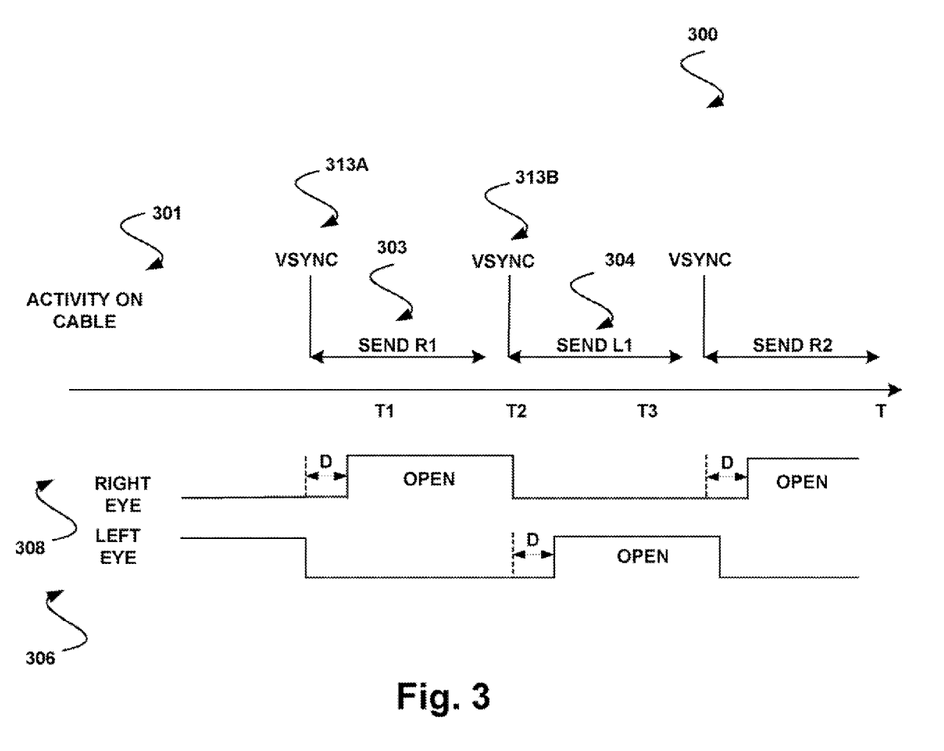
FIG. 3 shows an exemplary timing for controlling stereoscopic glasses, in accordance with one embodiment.

FIG. 3 shows an exemplary timing 300 for controlling stereoscopic glasses, in accordance with one embodiment. As an option, the present timing 300 may be utilized to carry out the method 200 of FIG. 2. Of course, however, the timing 300 may be used in any desired environment. Still yet, the above definitions apply during the following description.

As shown, a display receives display content over a communication medium 301, such as a digital video interface (DVI) or video graphics array (VGA) cable, or any other medium capable of communicating the display content, for that matter. In the context of the present description, such display content may include pixel-related information, image(s), and/or any other content or component thereof at any stage of processing capable of ultimately being displayed.

In FIG. 3, a first right image R1 intended for viewing only by a right eye is shown to be sent over the communication medium 301 first. Thereafter, there is a pause in transmission, namely the vertical blanking interval. Next, a first left image L1 intended for only the left eye is then sent, and so forth.

As further shown, a right eye shutter and left eye shutter of stereoscopic glasses are controlled independently. In one embodiment, this may be accomplished utilizing a right eye control signal 308 for controlling the right eye shutter and a left control signal 306 for controlling the left eye shutter.

To this end, the right eye shutter of the stereoscopic glasses may be controlled such that right left eye shutter is in an open orientation for a predetermined duration following an associated Vsync signal 313A, which follows the initial receipt of display content intended for the right eye. In a similar manner, the left eye shutter of the stereoscopic glasses may be controlled such that the left eye shutter is in the open orientation for a predetermined duration following an associated Vsync signal 313B, which follows the initial receipt of display content intended for a left eye.

Specifically, after first right display content R1 begins to be received at the display, the right eye shutter of the stereoscopic glasses may be triggered (to take on an open orientation) after a selected delay D following the associated Vsync signal 313A. As mentioned earlier, such delay may be selected as a function of a particular aspect of the display or the particular mode being displayed. By this feature, the system may reduce an amount of previously-depicted left eye display content that the right eye is subjected to, while the right eye shutter is open. This is due to the fact that, as time progresses, more and more of the first right display content R1 overwrites the previously-depicted left eye display content.

Similarly, after the first right display content R1 is completely displayed and first left display content L1 begins to be received at the display (thereby overwriting the right display content R1), the left eye shutter of the stereoscopic glasses may be triggered (to take on an open orientation) after the selected delay D following the associated Vsync signal 313B. Again, the system may reduce an amount of previously depicted right eye display content R1 that the left eye is subjected to, while the left eye shutter is open to expose the first left display content L1.

By incorporating such delay D in the foregoing manner, the right eye shutter and left eye shutter of the stereoscopic glasses may be controlled such that the right eye shutter and left eye shutter simultaneously remain in the closed orientation for a predetermined amount of time. As mentioned earlier, such technique reduces a duration in which each eye receives content, at least in part, not intended for such eye, resulting in enhanced stereo viewing of content on the display.

Strictly as an option, additional techniques may be employed for further increasing the duration in which the right eye shutter and left eye shutter simultaneously remain in the closed orientation. For example, a falling edge (as opposed to the leading edge) of the respective shutter signals may also be adjusted to accomplish this. More information regarding this and other optional techniques may be found with reference to an application entitled "SYSTEM, METHOD, AND COMPUTER PROGRAM PRODUCT FOR CONTROLLING STEREOSCOPIC GLASSES SHUTTERS" filed Aug. 4, 2006 under application Ser. No. 11/462,529, naming, as inventors, Gerrit A. Slavenburg, Thomas F. Fox, and David Robert Cook, and which is incorporated herein by reference in its entirety.

As an additional option, a duration of the aforementioned vertical blanking interval associated with received display content may be increased for enhancing a viewing experience when the display content is viewed utilizing the stereoscopic glasses. More information regarding such optional feature may be found with reference to an application entitled "SYSTEM, METHOD, AND COMPUTER PROGRAM PRODUCT FOR INCREASING AN LCD DISPLAY VERTICAL BLANKING INTERVAL filed Aug. 4, 2006 under application Ser. No. 11/462,535, naming, as inventors, Gerrit A. Slavenburg, Thomas F. Fox, and David Robert Cook, and which is incorporated herein by reference in its entirety.

Figure 4:
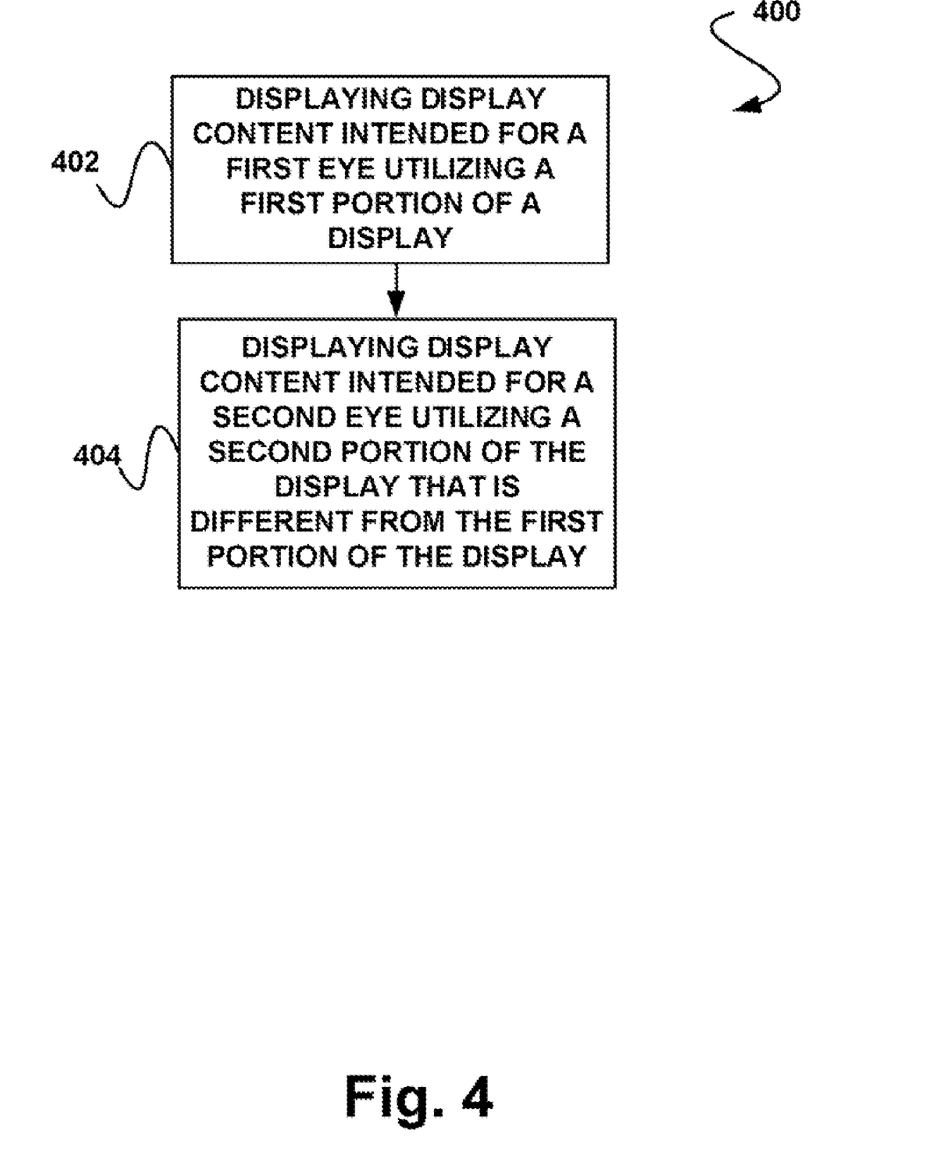
FIG. 4 shows a method for enhancing a stereoscopic display, in accordance with another embodiment.

FIG. 4 shows a method 400 for enhancing a stereoscopic display, in accordance with another embodiment. As an option, the present method 400 may or many not be carried out in the context of the various functionality set forth in FIGS. 2-3. Of course, however, the method 400 may be used in any desired environment. Still yet, the above definitions apply, during the following description.

In operation 402, display content intended for a first eye is displayed utilizing a first portion of a display. Further, display content intended for a second eye is displayed utilizing a second portion of the display that is different from the first portion of the display. See operation 404.

It should be noted that, in one embodiment, the aforementioned portions of the display may include pixels (or groups of pixels, etc.) of the display. Still yet, in other embodiments, the first portion of the display and the second portion of the display may include lines (or groups of lines, etc) of the display. Of course, such exemplary portions are set forth for illustrative purposes only and should not be construed as limiting in any manner whatsoever, since such portions may refer to any part(s) of the display.

Still yet, the first and second portions may be different in any desired manner. For example, in one embodiment, the second portion of the display may be at least partially non-inclusive of the first portion of the display. In other embodiments, the second portion of the display may be fully non-inclusive of the first portion of the display. Of course, embodiments are contemplated where the portions may or may not be mutually exclusive.

Thus, in one example of operation, null content may be displayed in conjunction with the display content. In the context of the present description, such use of null content may refer to any content that is at least partially non-inclusive of the display content. For example, the null content may include substantially black content, or even completely black content.

Specifically, such null content may be displayed utilizing the second portion of the display when the first portion of the display is utilized to display the display content intended for the first eye. Similarly, null content may be displayed utilizing the first portion of the display when the second portion of the display is utilized to display the display content intended for the second eye. Thus, in use, as the display of display content and null content alternates between the two portions of the display, each display content is displayed immediately following the display of null content.

To this end, such use of the null content may, in one embodiment, serve to accelerate a transition to the display of the display content intended for the first and second eye. Specifically, in the case of LCDs or similar displays, a transition from black content to display content with associated color, etc.) occurs faster than a transition between two sets of display content (again, each with associated color, etc.). Thus, by alternating between the null and display content in the foregoing manner, a response time associated with the display of display content may be improved, thus preventing a value of a previous frame from "bleeding" into in a value of a subsequent frame.

This may, in turn, be used to reduce a degree to which display content, at least in part, not intended for a particular eye affects stereo viewing. While different ways are contemplated for utilizing operations 402 and 404 for accomplishing the foregoing optional purpose, it should be noted that such operations may be used in any other desired manner for this or any other purpose (to otherwise improve stereo viewing, etc.).

More illustrative information will now be set forth regarding various optional architectures and features of different embodiments with which the foregoing functionality may or may not be implemented, per the desires of the user. It should be strongly noted that the following information is set forth for illustrative purposes and should not be construed as limiting in any manner. Any of the following features may be optionally incorporated with or without the exclusion of other features described.

Figure 5:
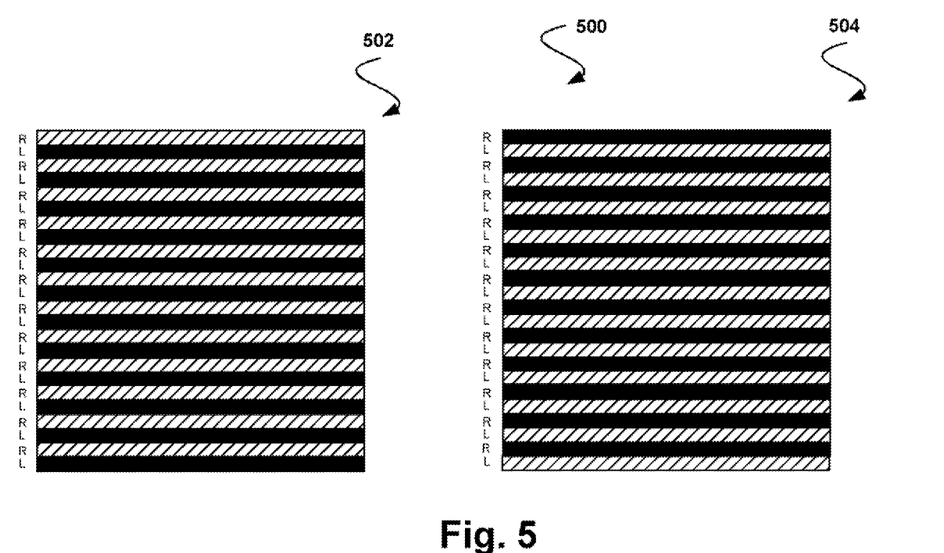
FIG. 5 illustrates a first example for enhancing a stereoscopic display, in accordance with yet another embodiment.
Figure 6:
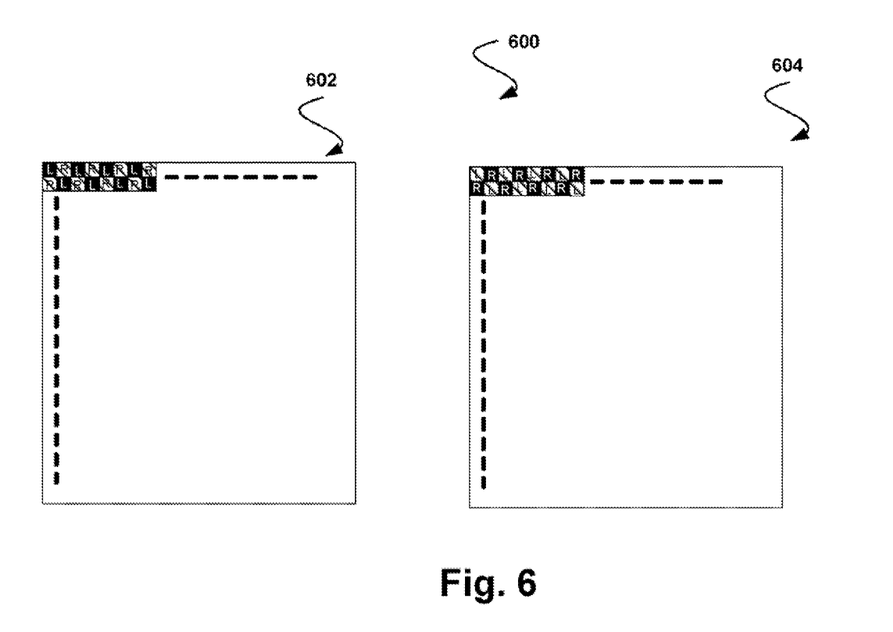
FIG. 6 illustrates a second example for enhancing a stereoscopic display, in accordance with still yet another embodiment.

FIGS. 5 and 6 illustrate examples 500 and 600 for enhancing a stereoscopic display, in accordance with different embodiments. As an option, the present examples 500 and 600 may be implemented in the context of the various functionality set forth in FIG. 4. Of course, however, the examples 500 and 600 may be used in any desired environment. Again, the above definitions during the following description.

As shown in FIG. 5, display content intended for a right and left eye are separated spatially by using odd scan lines for display content intended for viewing by the right eye and even scan lines for display content intended for viewing by the left eye. Of course, other embodiments are contemplated where even scan lines are used for display content intended for viewing by the right eye and odd scan lines are used for display content intended for viewing by the left eye. Still yet, multiple adjacent lines may be combined and considered as the first and second portions of the display, respectively.

With continuing reference to FIG. 5, first content 502 is displayed which is intended for a right eye. As shown, the odd scan lines are used to display content intended for viewing by the right eye, while the even scan lines are used to display null content. Similarly, thereafter, second content 504 is displayed which is intended for a left eye. As shown, the even scan lines are used to display content intended for viewing by the left eye, while the odd scan lines are used to display null content. By alternating between the first content 502 and the second content 504, the display content is displayed following the display of null content, thus reducing response time, etc.

As shown in FIG. 6, an alternate approach is illustrated where the portions of the display take a different form, namely pixels, in such embodiment, display content intended for a tight and left eye are separated spatially by using alternating pixels for display content intended for viewing by the appropriate eye. Of course, other embodiments are contemplated where even different patterns of pixels are employed.

As further shown in FIG. 6, first content 602 is displayed which is intended for a right eye. As illustrated, a first set of pixels is used to display content intended for viewing by the right eye, while a second set of pixels is used to display null content. Similarly, second content 604 is subsequently displayed which is intended for a left eye. As shown, the second set of pixels is used to display content intended for viewing by the left eye, while the first set of pixels is used to display null content. Again, by alternating between the first content 602 and the second content 604 the display content is displayed following the display of null content, thus reducing response time, etc.

While the foregoing technique may potentially reduce a resolution (e.g. by one half, etc.), it has the potential of reducing, if not eliminating, the aforementioned ghosting, etc. While complete separation of the right and left eye display content is set forth in the embodiments discussed hereinabove, it should be noted that other embodiments are contemplated where varying compromises are struck between a reduction in resolution and ghosting elimination.

Figure 7:
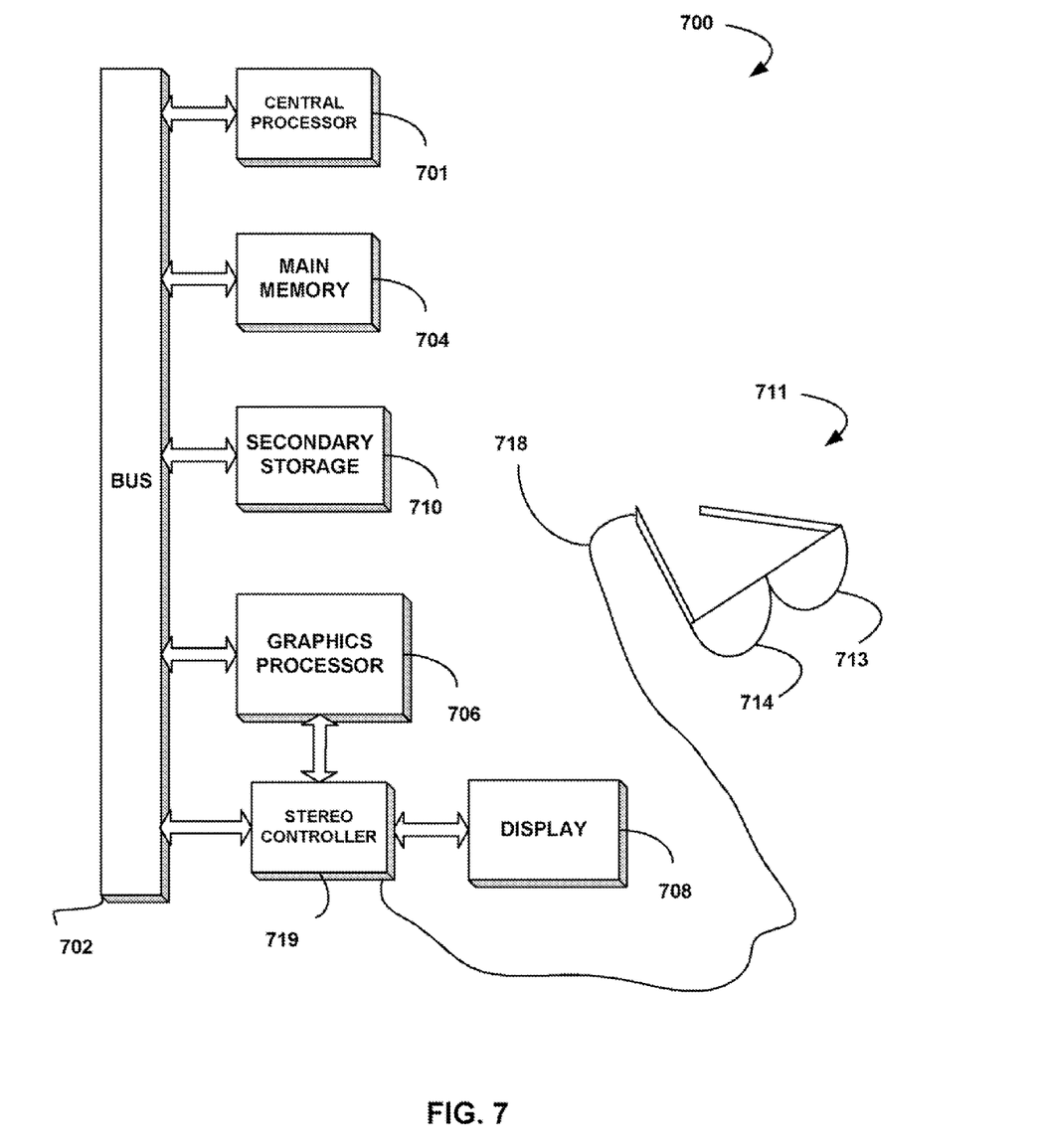
FIG. 7 illustrates an exemplary computer system in which the various architecture and/or functionality of different embodiments may be implemented.

FIG. 7 illustrates an exemplary computer system 700 in which the various architecture and/or functionality of different embodiments may be implemented. As an option, the computer system 700 may be implemented in the context of the functionality and/or environment of the previous figures. Of course, however, the system computer system 700 may be implemented in any desired environment. Again, the definitions introduced hereinabove apply during the following description.

As shown, a computer system 700 is provided including at least one host processor 701 which is connected to a communication bus 702. The computer system 700 also includes a main memory 704. Control logic (software) and data are stored in the main memory 704 which may take the form of random access memory (RAM).

The computer system 700 also includes a graphics processor 706 and a display 708 in the form of an LCD, DLP display, LCOS display, plasma display, or other similar display. In one embodiment, the graphics processor 704 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The computer system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 704 and/or the secondary storage 710. Such computer programs, when executed, enable the computer system 700 to perform various functions. Memory 704, storage 710 and/or any other storage are possible examples of computer-readable media.

Further included is a pair of stereoscopic glasses 711 capable of being worn on a face of a user. The stereoscopic glasses 711 include a right eye shutter 714 and a left eye shutter 713 that are capable of both an open orientation and a closed orientation. In use, the open orientation allows more light therethrough with respect to the closed orientation. Of course, such orientations may be achieved by any desired mechanical, electrical, optical (e.g. by way of various polarizations, etc.), and/or any other mechanism capable of carrying out the above functionality.

For control purposes, the stereoscopic glasses 711 may be coupled to a stereo controller 719 via a cable 718 (or without the cable 718 in a wireless environment). The stereo controller 719 is, in turn, coupled between the graphics processor 706 and the display 708 for carrying out the functionality to be set forth hereinabove. In some embodiments (e.g. particularly in the case of wireless stereoscopic glasses, etc.), the right eye shutter 714 and the left eye shutter 713 of the stereoscopic glasses 711 may be controlled utilizing a plurality of signals (e.g. codes, etc.). Of course, separate signals may be used to close only the right eye shutter 714, the left eye shutter 713, etc.

While the stereo controller 719 is shown to reside between the graphics processor 706 and the display 708, it should be noted that the stereo controller 719 may reside in any location associated with the computer system 700, the stereoscopic glasses 711, and/or even in a separate module, particularly (but not necessarily) in an embodiment where the graphics processor 706 is attached to a separate interface (e.g. USB, etc.) on the computer system 700. Still yet, the stereo controller 719 may comprise any hardware and/or software capable of the providing the desired functionality.

In various embodiments, the architecture and/or functionality of the various following figures may be implemented in the context of the host processor 701, graphics processor 706, stereo controller 719, a chipset (i.e. a group of integrated circuits designed to work and sold as a unit for performing related functions, etc.), and/or any other integrated circuit for that matter. Still yet, the architecture and/or functionality of the various following figures may be implemented in the context of a general computer system, a circuit board system, a game console system dedicated for entertainment purposes, an application-specific system, and/or any other desired system.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:

displaying display content intended for a first eye utilizing a first portion of a display device; and displaying display content intended for a second eye utilizing a second portion of the display device that is different from the first portion of the display device;

wherein the second portion of the display device is only partially non-inclusive of the first portion of the display device;

wherein at least one physical aspect of the display device is identified and a delay is selected based on the at least one physical aspect of the display device, where the at least one physical aspect of the display device, on which the selection of the delay is based, includes at least one of: a model of the display device, a brand of the display device, and a mechanical aspect of the display device;

wherein after the delay, a first eye shutter of stereoscopic glasses is triggered to take an open orientation for viewing the display content intended for the first eye or a second eye shutter of the stereoscopic glasses is triggered to take an open orientation for viewing the display content intended for the second eye;

wherein the delay is further based on a timing associated with a mode of operation of the display, where a first mode of operation of the display has a corresponding first resolution and first timing and a second mode of operation of the display has a corresponding second resolution and second timing, and further where the delay includes a first delay for the first mode of operation and the delay includes a second delay for the second mode of operation.

2. The method as recited in claim 1, wherein the display device includes a liquid crystal display device.

3. The method as recited in claim 1, wherein the first portion of the display device and the second portion of the display device include pixels of the display.

4. The method as recited in claim 1, wherein the first portion of the display device and the second portion of the display device include lines of the display.

5. The method as recited in claim 1, and further comprising displaying null content utilizing the second portion of the display device that is non-inclusive of the first portion of the display device when the first portion of the display device is utilized to display the display content intended for the first eye, and displaying null content utilizing the first portion of the display device that is non-inclusive of the second portion of the display device when the second portion of the display device is utilized to display the display content intended for the second eye.

6. The method as recited in claim 5, wherein the null content includes substantially black content.

7. The method as recited in claim 5, wherein the display of the null content accelerates a transition to the display of the display content intended for the first eye and the second eye.

8. The method as recited in claim 7, wherein a transition from black content to color content occurs faster than a transition between two sets of different color content, and where the null content is black content and the display content intended for the first eye and the second eye includes color content, such that the display of the null content accelerates the transition to the display of the display content intended for the first eye and the second eye by providing a transition between the black content of the null content and the color content of the display content intended for the first eye and the second eye.

9. The method as recited in claim 8, wherein the accelerating of the transition prevents a value of a previous frame from bleeding into a value of a subsequent frame.

10. The method as recited in claim 1, wherein the stereoscopic glasses are utilized for viewing the display content intended for the first eye and the second eye.

11. The method of claim 1, wherein the delay that is selected based on the at least one physical aspect is predetermined to correspond to the at least one physical aspect of the display device and is accessed from a look-up table.

12. The method of claim 11, wherein the look-up table is accessed utilizing a driver that is used to control the display device.

13. The method of claim 1, wherein the delay is initiated by and occurs after a vertical synchronization (Vsync) signal.

14. The method of claim 1, wherein after the display content intended for the first eye begins to be received at the display device, the first eye shutter of the stereoscopic glasses is triggered to take the open orientation after the delay following an associated Vsync signal.

15. The method of claim 14, wherein after the display content intended for the first eye is displayed utilizing the first portion of the display device and after the display content intended for the second eye begins to be received at the display device, the second eye shutter of the stereoscopic glasses is triggered to take the open orientation after the delay following an associated Vsync signal.

16. The method of claim 1, wherein by incorporating the delay, the first eye shutter and the second eye shutter of the stereoscopic glasses is controlled such that the first eye shutter and second eye shutter simultaneously remain in a closed orientation for a predetermined amount of time.

17. The method of claim 1, wherein the at least one physical aspect of the display device, on which the selection of the delay is based, includes the model of the display device.

18. The method of claim 1, wherein the at least one physical aspect of the display device, on which the selection of the delay is based, includes the brand of the display device.

19. The method of claim 1, wherein the at least one physical aspect of the display device, on which the selection of the delay is based, includes the mechanical aspect of the display device.

20. A computer program embodied on a non-transitory computer readable medium, comprising:
 computer code for displaying display content intended for a first eye utilizing a first portion of a display device; and
 computer code for displaying display content intended for a second eye utilizing a second portion of the display device that is different from the first portion of the display device;
 wherein the second portion of the display device is only partially non-inclusive of the first portion of the display device;
 wherein the computer program product is operable such that at least one physical aspect of the display device is identified and a delay is selected based on the at least one physical aspect of the display device, where the at least one physical aspect of the display device, on which the selection of the delay is based, includes at least one of: a model of the display device, a brand of the display device, and a mechanical aspect of the display device;
 wherein the computer program product is operable such that after the delay, a first eye shutter of stereoscopic glasses is triggered to take an open orientation for viewing the display content intended for the first eye or a second eye shutter of the stereoscopic glasses is triggered to take an open orientation for viewing the display content intended for the second eye;
 wherein the delay is further based on a timing associated with a mode of operation of the display, where a first mode of operation of the display has a corresponding first resolution and first timing and a second mode of operation of the display has a corresponding second resolution and second timing, and further where the delay includes a first delay for the first mode of operation and the delay includes a second delay for the second mode of operation.

21. The computer program as recited in claim 20, wherein the display device includes a liquid crystal display device.

22. The computer program as recited in claim 20, and further comprising computer code for displaying null content utilizing the second portion of the display device that is non-inclusive of the first portion of the display device when the first portion of the display device is utilized to display the display content intended for the first eye, and computer code for displaying null content utilizing the first portion of the display device that is non-inclusive of the second portion of the display device when the second portion of the display device is utilized to display the display content intended for the second eye.

23. The computer program as recited in claim 22, wherein the null content includes substantially black content.

24. The computer program as recited in claim 22, wherein the display of the null content accelerates a transition to the display of the display content intended for the first eye and the second eye.

25. The computer program as recited in claim 20, wherein the stereoscopic glasses are utilized for viewing the display content intended for the first eye and the second eye.

26. A system, comprising:
- a driver for controlling a display device to display content intended for a first eye utilizing a first portion of the display, and to display content intended for a second eye utilizing a second portion of the display device that is different from the first portion of the display device;
- wherein the second portion of the display device is only partially non-inclusive of the first portion of the display device;
    - wherein the system is operable such that at least one physical aspect of the display device is identified and a delay is selected based on the at least one physical aspect of the display device, where the at least one physical aspect of the display device, on which the selection of the delay is based, includes at least one of: a model of the display device, a brand of the display device, and a mechanical aspect of the display device;
- wherein the system is operable such that after the delay, a first eye shutter of stereoscopic glasses is triggered to take an open orientation for viewing the display content intended for the first eye or a second eye shutter of the stereoscopic glasses is triggered to take an open orientation for viewing the display content intended for the second eye;
- wherein the delay is further based on a timing associated with a mode of operation of the display, where a first mode of operation of the display has a corresponding first resolution and first timing and a second mode of operation of the display has a corresponding second resolution and second timing, and further where the delay includes a first delay for the first mode of operation and the delay includes a second delay for the second mode of operation.

27. The system as recited in claim 26, wherein the display device includes a liquid crystal display device.

28. The system as recited in claim 26, wherein further included are the stereoscopic glasses for viewing the display content intended for the first eye and the second eye.

29. The system as recited in claim 28, wherein further included is a computer in communication with the stereoscopic glasses for displaying stereo video content via the display device.

30. A method, comprising:
- displaying display content intended for a first eye utilizing a first portion of a display; and
- displaying display content intended for a second eye utilizing a second portion of the display that is different from the first portion of the display;
- wherein the second portion of the display is only partially non-inclusive of the first portion of the display;
    - wherein at least one physical aspect of the display is identified and a delay is selected based on the at least one physical aspect of the display, where the at least one physical aspect of the display, on which the selection of the delay is based, includes at least one of: a model of the display, a brand of the display, and a mechanical aspect of the display;
- wherein after the delay, a first eye shutter of stereoscopic glasses is triggered to take an open orientation for viewing the display content intended for the first eye or a second eye shutter of the stereoscopic glasses is triggered to take an open orientation for viewing the display content intended for the second eye;
- wherein the delay is further based on a timing associated with a mode of operation of the display, where a first mode of operation of the display has a corresponding first resolution and first timing and a second mode of operation of the display has a corresponding second resolution and second timing, and further where the delay includes a first delay for the first mode of operation and the delay includes a second delay for the second mode of operation.

31. The method of claim 30, wherein the mode of operation of the display device includes a horizontal resolution, a vertical resolution, and an update rate of the display device.

* * * * *

UNITED STATES PATENT AND TRADEMARK OFFICE
CERTIFICATE OF CORRECTION

PATENT NO. : 8,274,448 B1
APPLICATION NO. : 11/531995
DATED : September 25, 2012
INVENTOR(S) : David Robert Cook Page 1 of 1

It is certified that error appears in the above-identified patent and that said Letters Patent is hereby corrected as shown below:

Claim 16, col. 10, line 7; replace "dosed" with --closed--.

Signed and Sealed this
Nineteenth Day of March, 2013

Teresa Stanek Rea
*Acting Director of the United States Patent and Trademark Office*